Aug. 23, 1966  M. WAHLSTROM  3,267,813
METHOD OF PROPORTIONAL DUPLICATING
Original Filed Nov. 28, 1962  3 Sheets-Sheet 1
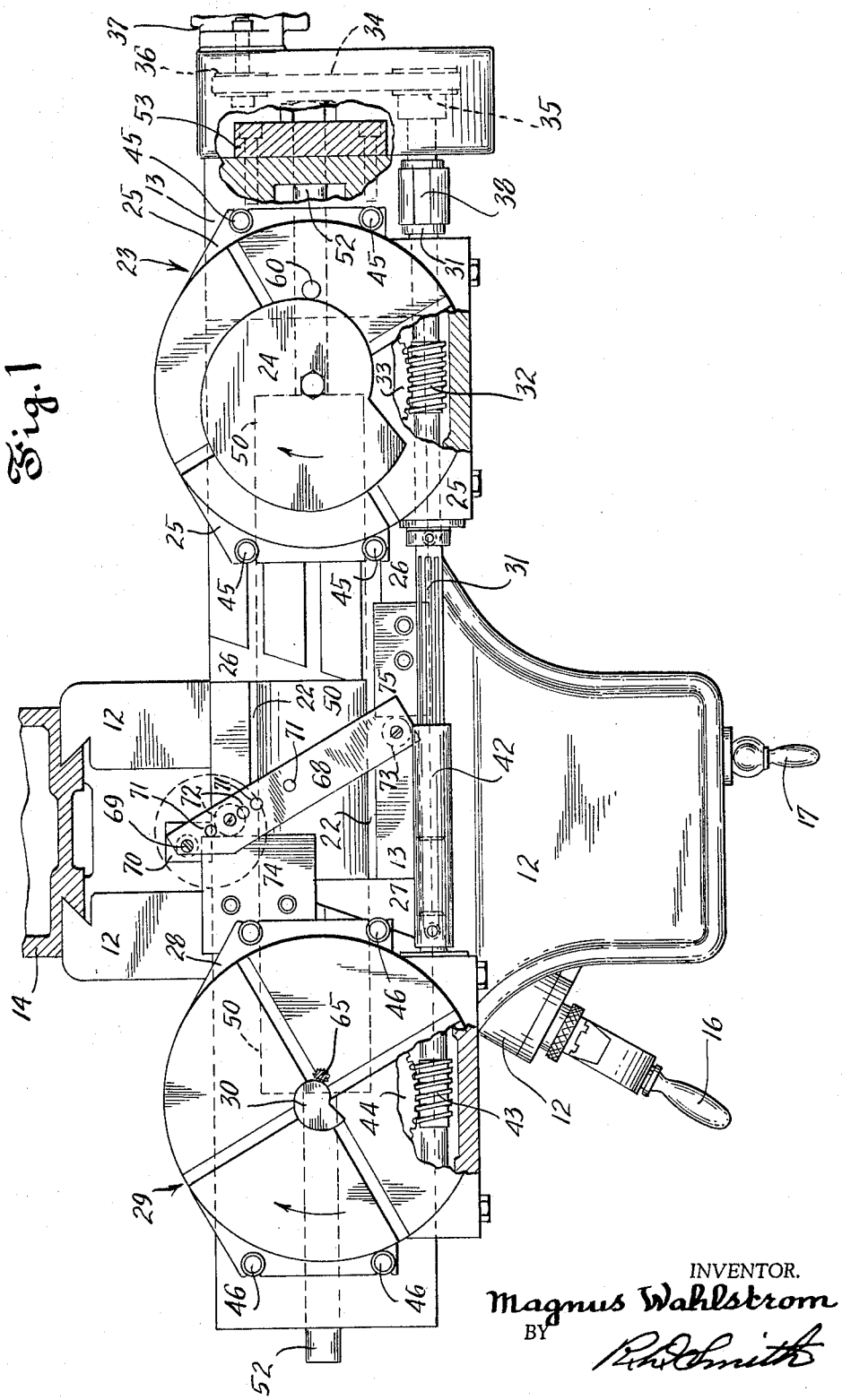
INVENTOR.
Magnus Wahlstrom
BY
ATTORNEY.

Aug. 23, 1966 M. WAHLSTROM 3,267,813
METHOD OF PROPORTIONAL DUPLICATING
Original Filed Nov 28, 1962 3 Sheets-Sheet 2
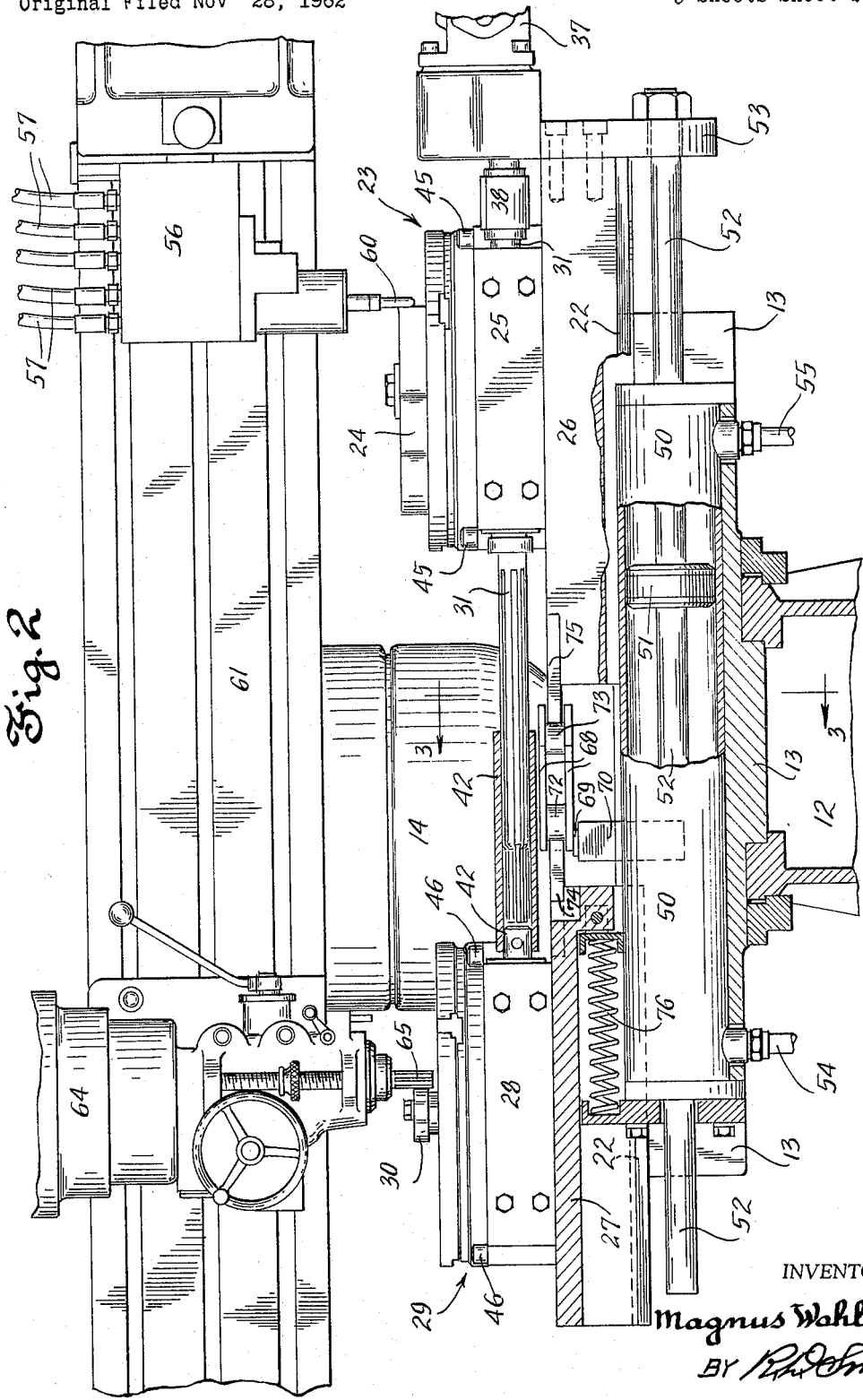
INVENTOR.
Magnus Wahlstrom
BY Rhd Smith
ATTORNEY.

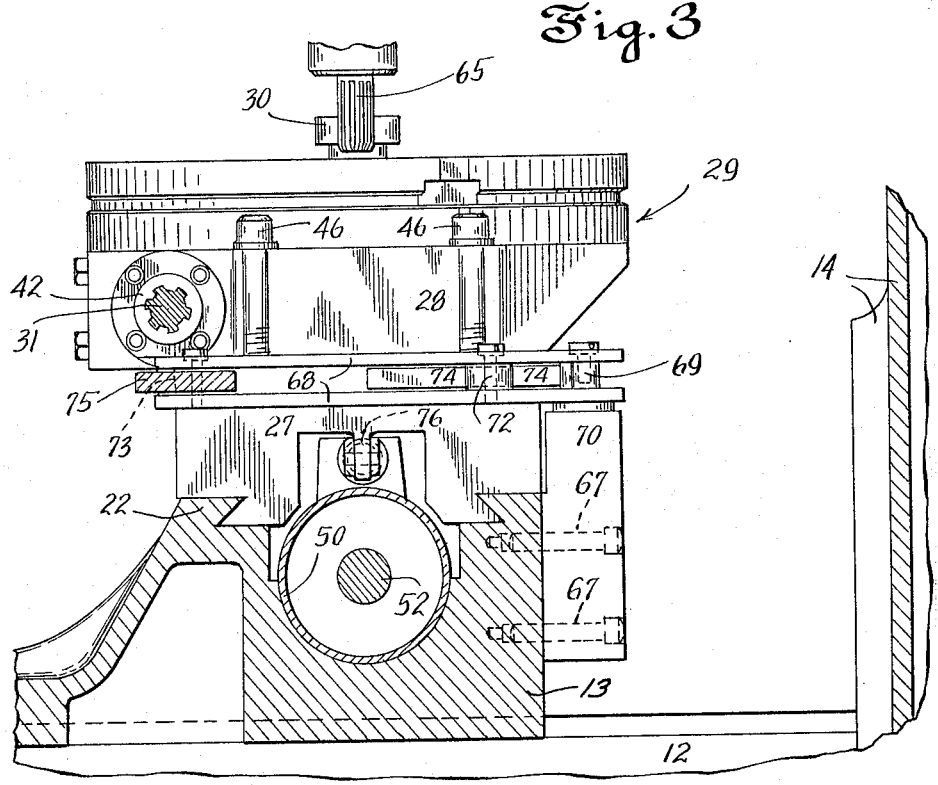

United States Patent Office  3,267,813
Patented August 23, 1966

3,267,813
METHOD OF PROPORTIONAL DUPLICATING
Magnus Wahlstrom, Easton, Conn., assignor to The Bridgeport Machines Inc., Bridgeport, Conn., a corporation of Connecticut
Original application Nov. 28, 1962, Ser. No. 240,632, now Patent No. 3,224,340, dated Dec. 21, 1965. Divided and this application Oct. 20, 1965, Ser. No. 498,562
3 Claims. (Cl. 90—13.3)

This application is divisional from my formerly copending application, Serial No. 240,632 filed November 28, 1962, now Patent No. 3,224,340 issued December 21, 1965, and relates to a method of generating in a rotatable work blank a configuration proportionally like that of a rotatable pattern and if desired of smaller dimensional size.

An object of the invention is to increase the accuracy and efficiency with which the shape of a master pattern can be reproduced in a workpiece on a commensurably smaller scale.

An object of the present improvements is to device a method of so doing that can be practiced with the aid of a machine tool and accessories of a nature generally familiar to operators of conventional milling machines.

Heretofore it has been deemed necessary to resort to pantographs or other complicated mechanisms for accomplishing the objects hereof. The presently improved method is susceptible of practice by causing the pattern and a machinable work blank to rotate synchronously while sliding toward and away from each other bodily in a common rectilinear path in accordance with departure from circular concentricity of the contour of a rotating pattern that is being traced.

An example of machine tool construction and set-up which can be used in practicing the improved method is disclosed in my aforesaid formerly copending application.

Such disclosure is repeated herein including a description of the aforesaid apparatus and machine construction which has reference to the appended drawings, wherein:

FIG. 1 is a plan view of the supporting parts of a milling machine carrying separate rotary tablets for the pattern and workpiece respectively, which tables include nonrotating bases that are moved relatively and simultaneously according to the present invention.

FIG. 2 is a front elevation of the parts shown in FIG. 1 with a stylus and a milling cutter stationed to coact therewith.

FIG. 3 is a view taken in section on the plane 3—3 in FIG. 2 looking in the direction of the arrows.

FIG. 4 is a side elevation of a complete milling machine equipped with the mechanisms of FIGS. 1, 2 and 3 and is drawn on a reduced scale.

In the drawings 12 represents the conventional knee and 13 the saddle of a milling machine in which the knee is vertically shiftable along ways on the standard 14 and supported by means of the usual jack screw 15 operated by the crank handle 16. Saddle 13 is adjustable horizontally along ways on the knee toward the right or toward the left in FIG. 4 by means of the usual crank handle 17. In practicing the invention the knee 12 and the saddle 13 remains stationed after working adjustments have been made.

Saddle 13 is equipped with the usual dovetail ways 22 extending crosswise the knee 12. At the right end of said ways in FIGS. 1 and 2 there is slidably carried on saddle 13 a rotary table, designated 23 as a whole, having the nonrotating base block 25 slidable with carriage 26 along the ways 22 of saddle 13 to which carriage, block 25 is secured by bolts 45. Rotary table 23 carries and rotates a pattern 24. At the left end of saddle 13 in FIGS. 1 and 2 a rotary table 29, separate from table 23, is designated 29 as a whole and has a nonrotating base block 28 which is secured by bolts 46 to a carriage 27 that is slidable along the saddle ways 22 relatively to table 23. Rotary table 29 carries and rotates workpiece 30 in unison with the rotation of the pattern 24.

Rotation of both tables 23 and 29 is produced in unison by a telescoping drive shaft having a driving portion 31 which carries a worm 32 in mesh with a worm gear 33 which rotates pattern table 23 on its base block 25 through mechanism typified in U.S. Patent No. 2,771,169. Shaft portion 31 is driven by a positive speed belt 34 trained about driven pulley 35 secured on a short extension of shaft 31 that is removably connected to said shaft by a coupling 38. Belt 39 is trained also about a driving pulley 36 on the rotary power shaft of a motor 37 which may be an electric, hydraulic or other form of prime mover. Motor 37 is fixedly carried on the carriage 26 of the pattern table 23. The remaining portion 42 of drive shaft 31 is slidably splined to the driving portion 31 of the shaft and carries a worm 43 in mesh with a worm gear 44 that rotates the workpiece carrying table 29. Both portions 31 and 42 of the telescopic shaft which drives the work tables have suitable bearings (not shown) in the base blocks 23 and 28, respectively, of the rotary tables.

Fixed on saddle 13 beneath and parallel with the ways 22 there is stationed an elongate, hollow, fluid tight cylinder 50 in which cylinder posing piston 51 reciprocates lengthwise of the cylinder posing responsively to fluid pressure in the latter. Movement of piston 51 produces lengthwise reciprocal movements of a piston rod 52 which has fluid tight slide bearings in the capped ends of cylinder 50. The right end of rod 52 is fixed to bracket member 53 fixedly depending from carriage 26 to travel with the pattern carrying rotary table 23 so carriage 26 and its carried base block 25 will reciprocate horizontally in FIG. 2 in unison with piston 51 carrying therewith the drive motor 37 for the rotary tables.

The position of piston 51 along cylinder 50 is variable by change in the balance between fluid pressures at the left side and at the right side of the piston. The fluid under pressure, preferably a liquid, is admissible to and exhaustible from cylinder 50 at opposite sides of piston 51 through conduit connected nipples such as 54 or 55, the conduits not herein being shown as connected thereto. Balance between the liquid pressure on opposite sides of piston 51 is determined automatically by hydraulic valve means designated in general as 56 in FIG. 2 so as to reciprocate the piston in either direction in positive accordance with progressive variation in the contour of the rotating pattern. It is not necessary herein to show details of the hydraulic valve means 56 because different versions of same are well understood in the art and are disclosed in various patents directed to hydraulic tracing machines, for instance U.S. Patents, Nos. 3,055,393 or 2,686,650; 2,331,817 and related patents in the same art. It therefore will suffice herein to point out that in typical hydraulic systems a series of conduits 57, see FIG. 2, may afford fluid communication between a source of fluid pressure (not shown) and the hydraulic valve 56 and through the conduit connections 54 and 55 with the cylinder 50.

Hydraulic valve 56 is fixedly stationed on a cross beam 61 that forms the frontal face of an overarm 62 carried by the turret 63 of a conventional tracing miller. Hydraulic valve 56 is actuated by slight lateral movement of a pilot finger 60 that depends from the housing of valve 56 and is maintained in contacting relation with the non circular configuration, or perpheral contour, of pattern 24. The pilot 60 is yieldingly biased toward the left in FIG. 2 by conventional structure not herein shown whereby to maintain its contacting relationship with the pattern as the periphery of the latter wipes therepast.

Also stationed on the cross beam 61 of overarm 62 is a self powered milling tool attachment 64 which may be like that shown in U.S. Patent 2,275,291 wherein a power motor 63 rotates the work machining tool or rotary cutter 65 about a vertical axis that remains positively fixed in relation to the knee 12 of the milling tracer. The position of tool 65 in relation to rotary work table 23 is such that the workpiece 30 while rotating will be configured by or have its peripheral contour generated by the stationed milling tool 65. The mechanical parts next to be described cause the tool 65 to trace in the workpiece a configuration or peripheral contour proportionally like that of the pattern 24 and in reduced size.

While a proportioning device for the purpose of the invention may take various forms, that shown herein comprises a rigid tandem arm 68 located intermediate the relatively slidable carriages 26 and 27 and pivotally anchored to the saddle 13 by a hinge pin 69 stationed on a bracket 70 that is secured on the saddle 13 by bolts 67 as best shown in FIG. 3. A series of threaded holes 71 spaced along the proportioning arm 68 affords a choice of changeable locations for antifriction thrust elements herein represented by a roller 72 at short lever arm distance from pivot pin 69 and a roller 73 at longer lever arm distance from said pivot. Roller 72 engages a lug 74 fixed on and projecting to the right from carriage 26 and simultaneously roller 73 engages a lug 75 fixed on and projecting to the belt from carriage 27. An expansion spring coil 76 under compression between one end of the saddle carried cylinder 50 and the rotary table carriage 27 constantly urges the latter toward the right in FIGS. 1 and 2 along the saddle 13 so that lug 74 thrusts constantly against roller 72 to swing proportioning arm 68 counterclockwise in FIG. 1. Thus roller 73 exerts constant thrust toward the right on the lug 73 of carriage 26 which urges the rotating pattern 24 toward the stylus 60. Through the hydraulic system including valve 56 hereinbefore mentioned stylus 60 causes the piston 51 and hence the rotary table 23 always to assume a position that maintains contact between the traced peripheral surface of the rotating pattern and stylus 60, due to modulated opening and closing of ports in the hydraulic valve 56. The corresponding oscillation of proportioning arm 68 about its stationary pivoted anchorage 69 thereby causes simultaneous but smaller extents of sliding movement of work carrying rotary table 29 in corresponding directions in FIG. 1. Movements of table 29 toward the left are forced by the shifting of piston 51 toward the left against the opposition of spring 76 and the latter stands ready at all times to cause movement of tables 23 and 29 toward the right whenever the pattern carriage 27 retreats in that direction.

While in practice it is preferred for heavy work that the piston 51 and its hydraulic system be employed for variably shifting the rotary table 23 right or left, such piston and hydraulic system may be omitted in cases of suitably light work. In that case the stylus 60 will be positively fixed against movement relative to the cross beam 61 and the pattern 24 will be constantly pressed thereagainst by spring 76 acting through carriage 27 and the proportioning arm 68. A simple marking tool that will merely scratch a configuration, say on a template, can be substituted for the milling cutter 65.

This and other obvious departures from the exact nature and relationship of parts herein illustrated are contemplated by the appended claims and intended to be covered thereby, as is also the method of arriving at the desired result residing in the relationship of simultaneous movements of the pattern and of the workpiece by whatever apparatus accomplished.

What is claimed is:

1. The method of generating in a rotating workpiece configuration proportionally like that of a rotating pattern, which comprises the steps of, rotating a pattern of irregular configuration with respect to the axis of pattern rotation, maintaining the contours of said pattern configuration in coincidence with a fixedly stationed reference point thereby simultaneously to move said pattern axis toward and away from said reference point, confining the movement of said pattern axis to a rectilinear pathway, rotating a workpiece about a work axis parallel with and spaced from said pattern axis along said pathway in working engagement with a fixedly stationed configuration generator, and simultaneously moving said work axis in the same direction as said pattern axis along said pathway to extents substantially in proportion to the movement of said pattern axis.

2. The method of generating in a rotating workpiece configuration proportionally like that of a rotating pattern, which comprises the steps of, rotating a pattern of irregular configuration with respect to the axis of pattern rotation, maintaining the contours of said pattern configuration in coincidence with a fixedly stationed reference point thereby simultaneously to move said pattern axis toward and away from said reference point, confining the movement of said pattern axis to a rectilinear direction, rotating a workpiece about a work axis parallel with said pattern axis in working engagement with a fixedly stationed configuration generator, and simultaneously moving said work axis in said rectilinear direction to extents substantially in proportion to the movement of said pattern axis in said rectilinear direction, the said movement of the said axis of pattern rotation and the said movement of the said axis of workpiece rotation taking place in a common straight line intersecting both of said axes.

3. The method of generating in a rotating workpiece configuration proportionally like that of a rotating pattern, which comprises the steps of, rotating a pattern of irregular configuration with respect to the axis of pattern rotation, maintaining the contours of said pattern configuration in coincidence with a fixedly stationed reference point thereby simultaneously to move said pattern axis toward and away from said reference point, confining the movement of said pattern axis to a rectilinear direction, rotating a workpiece about a work axis parallel with said pattern axis in working egagement with a fixedly stationed configuration generator, and simultaneously moving said work axis in said rectilinear direction to extents substantially in proportion to the movement of said pattern axis in said rectilinear direction, together with the step of urging at least one of the said axes of rotation toward the other of said axes of rotation during the said simultaneous movement of said axes.

References Cited by the Examiner
UNITED STATES PATENTS
2,718,702   9/1955   Glass _____ 90—13.1 X WILLIAM W. DYER, JR., *Primary Examiner*
G. A. DOST, *Assistant Examiner.*